United States Patent
Gerstberger et al.

(10) Patent No.: US 8,744,756 B2
(45) Date of Patent: Jun. 3, 2014

(54) METHOD FOR THE DETERMINATION OF AN ECOLOGICAL ROUTE ATTRIBUTE

(71) Applicant: Bayerische Motoren Werke Aktiengesellschaft, Munich (DE)

(72) Inventors: Christian Gerstberger, Germering (DE); Stefan Wiebel, Munich (DE); Werner Richter, Unterhaching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/906,935

(22) Filed: May 31, 2013

(65) Prior Publication Data
US 2013/0261955 A1 Oct. 3, 2013

Related U.S. Application Data

(63) Continuation of application No. PCT/EP2011/071080, filed on Nov. 25, 2011.

(30) Foreign Application Priority Data

Dec. 1, 2010 (DE) .......................... 10 2010 062 296

(51) Int. Cl.
 *G01C 21/34* (2006.01)
(52) U.S. Cl.
 USPC ........................... 701/420; 701/409; 701/123
(58) Field of Classification Search
 USPC ......... 701/104, 123, 409, 412, 420, 430, 439, 701/424, 300; 340/989, 991
 See application file for complete search history.

(56) References Cited

U.S. PATENT DOCUMENTS

| 6,240,364 | B1 * | 5/2001 | Kerner et al. ................. 701/423 |
| 6,714,857 | B2 * | 3/2004 | Kapolka et al. ............... 701/123 |
| 6,728,607 | B1 * | 4/2004 | Anderson ....................... 701/25 |
| 2007/0005237 | A1 | 1/2007 | Needham et al. | |

FOREIGN PATENT DOCUMENTS

| DE | 10 2005 055 243 A1 | 5/2007 |
| WO | WO 2010/074668 A1 | 7/2010 |

OTHER PUBLICATIONS

International Preliminary Report on Patentability (PCT/IB/373), including Written Opinion (PCT/ISA/237) dated Jun. 4, 2013 (six (6) pages).
International Search Report dated Feb. 1, 2012 w/ English translation (four (4) pages).
German Search Report dated Jun. 6, 2011 w/ partial English translation (ten (10) pages).

* cited by examiner

*Primary Examiner* — Richard Camby
(74) *Attorney, Agent, or Firm* — Crowell & Moring LLP

(57) ABSTRACT

A method is provided for determining an ecological route attribute, in which at least one current energy consumption value is determined by a motor vehicle. A current measurement location is determined by the motor vehicle. An ecological location attribute, which includes the measurement location and the current energy consumption value, is formed by the motor vehicle and transmitted to a central processor. An ecological route attribute is determined by the central processor on the basis of a plurality of received ecological location attributes, which in each case includes a measurement location, which ecological route attribute describes an energy consumption on a route section which has a prescribed spatial relationship with the measurement locations.

21 Claims, 1 Drawing Sheet

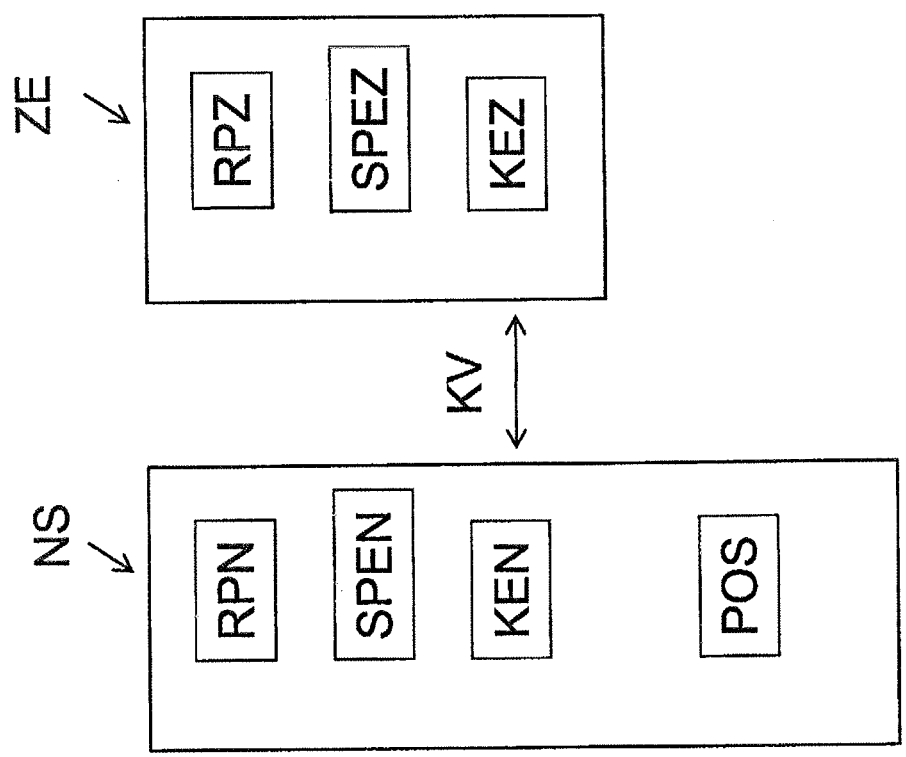

METHOD FOR THE DETERMINATION OF AN ECOLOGICAL ROUTE ATTRIBUTE

CROSS REFERENCE TO RELATED APPLICATIONS

This application is a continuation of PCT International Application No. PCT/EP2011/071080, filed Nov. 25, 2011, which claims priority under 35 U.S.C. §119 from German Patent Application No. DE 10 2010 062 296.6, filed Dec. 1, 2010, the entire disclosures of which are herein expressly incorporated by reference.

BACKGROUND AND SUMMARY OF THE INVENTION

The invention relates to a method for the determination of an ecological route attribute which is particularly used for the purpose of determining a route.

Using navigation systems, it is possible to calculate optimized routes between a starting point and a destination point based on a digital road map and according to different criteria. In this case, various different cost elements such as driving time or driving distance, by way of example, are functionally assigned to the road segments.

No systems have yet been implemented wherein energy consumption is assigned to the road segments as a cost element. One problem with such an approach is that it is difficult to determine the energy required to travel a road segment using geodata and a centralized approach. In addition, this varies greatly according to the vehicle type.

The invention therefore addresses the problem of improving the prior art.

This problem is addressed by providing a method for the determination of an ecological route attribute. At least one momentary energy consumption value is determined by at least one motor vehicle. At least one momentary measurement position is determined by the motor vehicle. At least one ecological position attribute, which includes the measurement position and the momentary energy consumption value, is created by the motor vehicle. At least one ecological position attribute is transmitted to a central processor. And, an ecological route attribute is determined by the central processor based on a plurality of received ecological position attributes which each include a measurement position, wherein the ecological route attribute describes an energy consumption on a road segment which has a predefined, positional relationship to the measurement positions In the method according to the invention for the determination of an ecological route attribute, at least one value for momentary energy consumption is determined by way of at least one motor vehicle, and particularly by way of a corresponding on-board computer, when this determination is initiated by an event, or is initiated from time to time, or is repeated after a predefined distance has been traveled.

The value for energy consumption is, by way of example, an averaged energy consumption value (energy required, energy required per unit of time, energy required per unit of distance, fuel used, fuel used per unit of time, fuel used per unit of distance, power consumed, etc.) of the motor vehicle, particularly on the corresponding route segment or road segment, over a route which has just been traveled, and/or over a time during which travel has just occurred.

In addition, at least one momentary measurement location (location of the determination) is determined by the motor vehicle, for example by way of a satellite-based positioning method.

In addition, at least one ecological position attribute, which includes the measurement location and the momentary energy consumption value, is created by the motor vehicle, and is transmitted to a central processor—for example a central navigation server, a central map server, and/or a central service computer.

An ecological route attribute is determined by the central processor based on a plurality of received ecological position attributes which each include one measurement position, and the ecological route attribute describes a consumption of energy (energy required, energy required per unit of time, energy required per unit of distance, fuel used, fuel used per unit of time, fuel used per unit of distance, power consumed, etc.) on one route segment, wherein the consumption of energy has a predefined positional relationship to the measurement position of at least one (of the plurality of received ecological position attributes named above) ecological position attribute, or has a predefined positional relationship to the measurement positions of the named plurality of received ecological position attributes.

In this way, it is possible to aggregate locally-determined energy consumption values in a central processor as a result of the process being initiated by a specific position, and particularly a road segment, in order to make them available for a route calculation.

In one implementation of the invention, the road segment includes the measurement position, or is determined from the measurement position. By way of example, the measurement positions are located on the road segment, or directly next to the same. In this way, it is possible to functionally assign ecological position attributes to a road segment.

In a further development of the invention, a momentary time of measurement is determined by a motor vehicle, the ecological position attribute includes the time of measurement, and the ecological position attributes are classified chronologically by the central processor according to each of the associated times of measurement, and are assigned chronologically to corresponding, classified ecological route attributes.

In this manner, chronologically classified ecological route attributes are created which can be used selectively at the corresponding time points for the purpose of calculating a route.

In one alternative or complementary development, the ecological position attribute includes the vehicle type and/or engine type of the motor vehicle, the same being read out of a memory device, for example, and the received ecological position attribute is classified by the central processor according to each of the associated vehicle types and/or engine types, then assigned to ecological route attributes which are accordingly classified by vehicle type or engine type.

In this way, ecological route attributes which are classified by vehicle type and/or engine type are created which can be used selectively in the calculation of energy-efficient routes for corresponding vehicle types and/or vehicle types with corresponding engine types.

The use of the method according to the invention and/or the use of the ecological route attributes created by way of a method according to the invention is particularly advantageous as part of the calculation of an energy-efficient route.

In this case, a cost-optimized route is preferably determined based on a plurality of ecological route attributes, wherein the costs of a route are determined in response to a plurality of ecological route attributes—optionally among other things.

In one preferred embodiment, such a cost-optimized route is determined by the central processor, and data which is used to describe the determined route is transmitted to a motor vehicle—particularly to a navigation system of a motor vehicle.

As an alternative or as a complement to the above, a plurality of ecological route attributes is transmitted by the central processor to at least one motor vehicle, and a route is determined by the motor vehicle, and particularly a navigation system of the motor vehicle, in response to a plurality of ecological route attributes.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows a simplified communication system including a navigation system and a central processor.

DETAILED DESCRIPTION OF THE DRAWING

FIG. 1 shows a communication system which has a navigation system as part of a motor vehicle, and a central processor ZE as part of a central infrastructure—for example a navigation server.

The navigation system has, among other things, a known position determination device POS, a known route planner RPN, a storage device SPEN for saving ecological route attributes and ecological position attributes, and a communication device KEN, such as a mobile radio module, for example, for the purpose of exchanging information with the central processor ZE via a communication connection KV, and particularly for transmitting ecological position attributes and for receiving ecological route attributes.

In this case, the communication device KEN or the storage device SPEN can particularly be implemented in a different housing from the route planner RPN, and can be additionally used for further purposes as well.

The central processor ZE has a known route planner RPZ, a storage device SPEZ for the purpose of saving ecological route attributes and ecological position attributes, and a communication device KEZ, such as a mobile radio module, for example, for the purpose of receiving ecological position attributes from a plurality of motor vehicles, particularly from navigation systems, and for transmitting ecological route attributes to a plurality of motor vehicles, particularly to navigation systems.

The central processor ZE additionally has an ecological route attribute generator which is not illustrated, wherein ecological route attributes associated with the individual received ecological position attributes can be generated or updated in response to the same. The ecological route attribute generator can be realized, as far as hardware is concerned, by the same computer device as the route planner RPZ.

A method for the determination of ecological route attributes is now explained below, making use of the central processor described immediately above, by way of processors being equipped with corresponding programs.

It is assumed that the navigation system NS which is located inside a vehicle, travels along a road which is known to the navigation system NS.

In a manner which is already known, an average fuel consumption (liters per kilometer) is determined every 500 meters, for example, wherein the consumption was required to move the vehicle along the road for the 500 meters traveled.

The momentary energy consumption value (fuel required, fuel consumed) is linked to a measurement position in a database, and the result is stored in memory as an ecological position attribute.

By way of example, the position at the start of the 500 meters, as determined by the GPS system of the motor vehicle and/or the navigation system NS, is used as the measurement position, and/or the position at the end of the 500 meters as determined by a GPS system is used, or a position is used which is between the two positions.

According to a variation of the embodiment, a time of measurement, a vehicle type and/or an engine type is assigned to the ecological position attribute. This information is generated by known components of the motor vehicle, or is read out of known components of the motor vehicle.

After each time that a predefined plurality of ecological position attributes is determined, each of these determinations occurring after a predefined time period has expired, or as initiated by another predefined event, a plurality of ecological position attributes determined in this way and saved in memory is combined into one ecological position attribute message and transmitted from the communication device KEN of the navigation system NS to the communication device KEZ of the central processor ZE.

Corresponding methods are carried out by a plurality of navigation systems NS or a plurality of motor vehicles.

In the central processor ZE, the ecological position attributes received from a plurality of navigation systems NS are evaluated. For this purpose, first the measurement position of an ecological position attribute is compared to road segments which are predefined in the central processor ZE, and which are particularly 500 meters long. The energy consumption value of an ecological position attribute is assigned to the road segment in which the measurement position of the respective ecological position attribute is found. An ecological route attribute is created by, for example, averaging the plurality of energy consumption values which are assigned to a road segment in this manner, wherein the ecological route attribute describes an average energy consumption value for a road segment.

If the ecological position attributes also include a time of measurement, an engine type and/or a vehicle type, the resulting ecological route attributes can then be classified according to the time of measurement, an engine type and/or a vehicle type.

The ecological route attributes determined in this manner are saved in a database of the central processor ZE or, after transmission to a navigation system NS, in a database of the navigation system NS.

In the event that a route should later be determined by the central processor E or a navigation system NS, in a known manner, the route being optimized for energy consumption, then the ecological route attributes are used as the cost element, or as one of multiple cost elements, for the routing along the associated road segment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining an ecological route attribute, the method comprising the acts of:
   determining at least one momentary energy consumption value by at least one motor vehicle;

determining at least one momentary measurement position by the at least one motor vehicle;

creating, by the motor vehicle, at least one ecological position attribute which includes the momentary measurement position and the momentary energy consumption value;

transmitting the at least one ecological position attribute to a central processor;

defining, by the central processor, a plurality of road segments having a predetermined length; and determining an ecological route attribute by the central processor based on a plurality of received ecological position attributes, each including a measurement position along a corresponding one of the plurality of road segments, wherein the determined ecological position attribute describes an energy consumption for the corresponding road segment, having the predetermined length, and having a predefined positional relationship to the measurement positions.

2. The method according to claim 1, wherein the road segment includes the measurement positions.

3. The method according to claim 1, wherein the road segment is determined by the measurement positions.

4. The method according to claim 1, further comprising the acts of:
determining a momentary measurement time by at least one motor vehicle, wherein
the ecological position attribute includes the determined measurement time, and
the received ecological position attributes are classified chronologically by the central processor according to respective, associated measurement time, and are assigned to ecological route attributes that are accordingly chronologically classified.

5. The method according to claim 1, wherein:
the ecological position attribute includes a vehicle type or an engine type of the motor vehicle; and
the received ecological position attributes are classified by the central processor according to respective, associated vehicle type or engine type, and are assigned to ecological route attributes that are accordingly classified by vehicle type or engine type.

6. The method according to claim 1, further comprising the act of:
determining a route based on a plurality of ecological route attributes.

7. The method according to claim 1, further comprising the act of:
determining a cost-optimized route based on a plurality of ecological route attributes, wherein route costs are determined as a function of the plurality of ecological route attributes.

8. The method according to claim 1, further comprising the acts of:
determining a route by the central processor; and
transmitting to the motor vehicle information used to describe the determined route.

9. The method according to claim 1, further comprising the acts of:
transmitting a plurality of ecological route attributes to at least one motor vehicle; and
determining a route by the motor vehicle as a function of a plurality of ecological route attributes.

10. A method for determining an ecological route attribute, the method comprising the acts of:
receiving, in a central processor, an ecological position attribute, wherein the ecological position attribute was created by a motor vehicle and includes a momentary measurement position and a momentary energy consumption value determined by the motor vehicle;
defining, by the central processor, a plurality of road segments having a predetermined length; and
determining, by the central processor, an ecological route attribute based on a plurality of received ecological position attributes that each include a measurement position along a corresponding one of the plurality of road segments, wherein the determined ecological route attribute describes an energy consumption for the corresponding road segment, having the predetermined length, and having a predefined positional relationship to the measurement positions.

11. The method according to claim 10, wherein the received ecological position attributes include a momentary measurement time determined by the motor vehicle; and further comprising the act of:
classifying chronologically, by the central processor, the received ecological position attributes according to their respective associated measurement times, and assigning the received ecological position attributes to ecological route attributes that are accordingly chronologically classified.

12. The method according to claim 10, wherein the received ecological position attributes include vehicle type or engine type of the motor vehicle, and further comprising the act of:
classifying, by the central processor, the received ecological position attributes according to their associated vehicle type or engine type, and assigning the received ecological position attributes to ecological route attributes accordingly classified by vehicle type or engine type.

13. The method according to claim 10, further comprising the act of:
determining a route for a motor vehicle based on a plurality of determined ecological route attributes.

14. The method according to claim 13, further comprising the act of:
transmitting information used to describe the determined route to a navigation system of the motor vehicle.

15. The method according to claim 10, further comprising the act of:
transmitting a plurality of ecological route attributes determined by the central processor to a motor vehicle for the motor vehicle to determine a route based on the plurality of ecological route attributes.

16. A method for determining an ecological route attribute, the method comprising the acts of:
determining, by a motor vehicle, a momentary energy consumption value;
determining, by the motor vehicle, a momentary measurement position;
creating, by the motor vehicle, an ecological position attribute that includes the momentary measurement position and the momentary energy consumption value;
transmitting the created ecological position attribute to a central processor in which an ecological route attribute is determinable based on a plurality of ecological position attributes that have been transmitted to the central processor, wherein the ecological route attribute describes an energy consumption for one of a plurality of road segments, defined as having a predetermined length and as having a predefined positional relationship to the measurement positions.

17. The method according to claim 16, further comprising the acts of:
- determining, by the motor vehicle, a momentary measurement time;
- wherein the created ecological position attribute includes the measurement time in order for the central processor to classify chronologically the transmitted ecological position attributes so as to assign the transmitted ecological position attributes to ecological route attributes that are accordingly chronologically classified.

18. The method according to claim 16, further comprising the acts of:
- obtaining the vehicle type or the engine type of the motor vehicle by the motor vehicle; and
- wherein the transmitted ecological position attribute includes the vehicle type or the engine type in order for the central processor to classify the transmitted ecological position attributes according to their vehicle type or engine type so as to assign the received ecological position attributes to ecological route attributes that are accordingly classified by vehicle type or engine type.

19. The method of claim 1, wherein the predetermined length of the plurality of road segments is a common predetermined fixed length.

20. The method of claim 10, wherein the predetermined length of the plurality of road segments is a common predetermined fixed length.

21. The method of claim 16, wherein the predetermined length of the plurality of road segments is a common predetermined fixed length.

* * * * *